US010272354B2

(12) United States Patent
Franz et al.

(10) Patent No.: US 10,272,354 B2
(45) Date of Patent: Apr. 30, 2019

(54) LIQUID DISTRIBUTOR OF A PROCESS-TECHNOLOGY COLUMN

(71) Applicant: RVT Process Equipment GmbH, Steinwiesen (DE)

(72) Inventors: Uwe Franz, Wallenfels (DE); Werner Geipel, Steinwiesen (DE)

(73) Assignee: RVT Process Equipment GmbH, Steinwiesen (DE)

( * ) Notice: Subject to any disclaimer, the term of this patent is extended or adjusted under 35 U.S.C. 154(b) by 425 days.

(21) Appl. No.: 14/879,541

(22) Filed: Oct. 9, 2015

(65) Prior Publication Data

US 2016/0107098 A1 Apr. 21, 2016
US 2016/0271515 A2 Sep. 22, 2016
US 2017/0246554 A2 Aug. 31, 2017

(30) Foreign Application Priority Data

Oct. 16, 2014 (DE) ........................ 10 2014 115 077

(51) Int. Cl.
*B01D 1/20* (2006.01)
*B01D 3/00* (2006.01)
*B05B 1/04* (2006.01)

(52) U.S. Cl.
CPC ............... *B01D 3/008* (2013.01); *B01D 1/20* (2013.01); *B05B 1/04* (2013.01)

(58) Field of Classification Search
CPC .............. B01D 1/20; B01D 3/008; B05B 1/04
See application file for complete search history.

(56) References Cited

U.S. PATENT DOCUMENTS

| 4,158,092 A | 6/1979 | Bötsch et al. |
| 4,816,191 A | 3/1989 | Berven et al. |
| 4,855,089 A | 8/1989 | Michels |
| 4,909,967 A | 3/1990 | Binkley et al. |

(Continued)

FOREIGN PATENT DOCUMENTS

| CA | 1081880 A | 7/1980 |
| CH | 205 102 A | 6/1939 |

(Continued)

OTHER PUBLICATIONS

English Machine translation of DE 10 2007 000 705. Obtained from Google Feb. 1, 2018.*

(Continued)

*Primary Examiner* — Renee Robinson
(74) *Attorney, Agent, or Firm* — Drinker Biddle & Reath LLP

(57) ABSTRACT

A process-technology column including a novel liquid distributor which is to be as insensitive as possible to dirt or solids carried in the liquid and which can be operated over a load range as great as possible without the possibility of the delivered liquid being excessively easily entrained by the gas flow which rises in the column is provided. The liquid distributor includes a liquid feed for conducting a liquid and at least 2 nozzles connected thereto for producing a respective liquid jet. The nozzles are flat-jet nozzles for producing a respective flat jet. The flat-jet nozzles are so oriented that the flat jet produced by them impinges on a drain element which is arranged at the liquid distributor and at which the liquid of the flat jet can drain away.

17 Claims, 4 Drawing Sheets

(56) References Cited

U.S. PATENT DOCUMENTS

Figure 1:
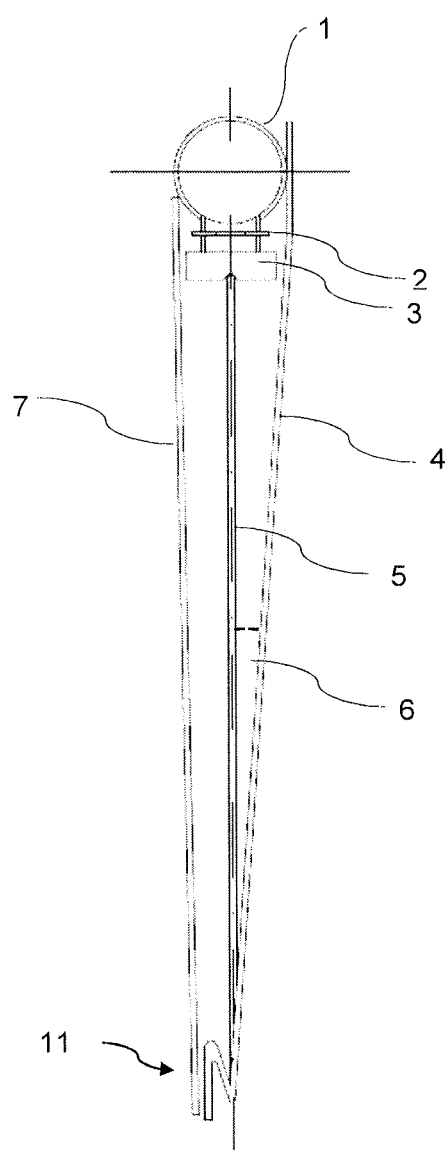

| | | | |
|---|---|---|---|
| 6,098,895 A * | 8/2000 | Walzel | B05B 3/1021 239/223 |
| 7,712,728 B2 | 5/2010 | Kehrer | |
| 2010/0089232 A1 | 4/2010 | Neumann et al. | |

FOREIGN PATENT DOCUMENTS

| | | |
|---|---|---|
| CN | 1282267 A | 1/2001 |
| CN | 201873903 U | 6/2011 |
| DE | 1 105 389 B | 4/1961 |
| DE | 24 35 704 A1 | 2/1976 |
| DE | 28 20 200 A1 | 11/1979 |
| DE | 31 00 004 A1 | 8/1982 |
| DE | 38 02 718 A1 | 8/1989 |
| DE | 100 21 264 A1 | 10/2001 |
| DE | 10 2007 000 705 A1 | 3/2009 |
| EP | 0 282 753 A1 | 9/1988 |
| EP | 1 464 370 A1 | 10/2004 |
| GB | 1 599 128 A | 9/1981 |
| GB | 2 090 544 A | 7/1982 |
| JP | S5137175 A | 3/1976 |
| WO | WO-99/25446 A1 | 5/1999 |
| WO | WO-2009/033938 A1 | 3/2009 |

OTHER PUBLICATIONS

First Chinese Office Action issued in Chinese patent application No. 201510672806.X dated Jul. 12, 2018 and its English language translation thereof.

\* cited by examiner

LIQUID DISTRIBUTOR OF A PROCESS-TECHNOLOGY COLUMN

The present invention concerns a liquid distributor of a process-technology column, wherein the liquid distributor has a liquid feed for conducting a liquid and at least 2 nozzles connected thereto for producing a respective liquid jet. In addition the present invention concerns a process-technology column including the liquid distributor and a method of purifying or separating a liquid mixture in a process-technology column, wherein the liquid mixture is delivered by way of the liquid distributor.

Process-technology purification or separation or liquid mixtures is effected for the major part in columns. In those separating apparatuses, mass transfer is effected between a rising gaseous phase and a liquid which is draining from above downwardly. The apparatuses contain various internal fitments of differing functionalities. If purification or separation of the liquid mixture is effected by means of packed beds and/or structured packings they have to be sprinkled by suitable liquid distribution devices. To ensure an intensive mass transfer between the phases the liquid flow has to be distributed uniformly on the column cross-section.

Various types of liquid distributors which are used for that purpose are known, thus for example distributor trays, channel distributors, tube distributors and nozzle distributors. In that case liquid distribution is effected either by way of liquid head distribution through bores in the bottom of the distributor (distributor trays) or laterally bored delivery tubes, overflow distribution through lateral slots or overflow spouts (channel distributors) or nozzles (nozzle distributors) and each of the specified alternatives have their specific advantages and disadvantages.

Many distributor trays significantly reduce the free cross-section of the column in the region of the distributor tray and can lead to a corresponding pressure drop at the gas side. The working range of channel distributors is limited as the liquid is delivered solely by way of the force of gravity of the accumulated liquid through drain bores and, in order to keep the volume flow within limits, relatively small bore diameters are therefore frequently required, which can become easily clogged when dealing with polluted liquids like for example in refineries. The working range of nozzle distributors is greater in comparison with that of channel distributors as there is more variability by way of adjustment of the desired upstream pressure in the nozzles and the circular spray patterns of the full-cone nozzles which are usually employed are arranged in overlapping relationship so that the liquid to be separated is sprayed over the entire cross-section of the column. The fine droplets produced in that case are however easily entrained by the gas flow which rises in the column and therefore in part do not pass directly on to the filling bodies or packings, as is actually intended.

Therefore the present invention seeks to attain the object of providing a novel liquid distributor for a process-technology column, wherein the liquid distributor is to be as insensitive as possible to dirt or solid bodies contained in the liquid which is to be purified or separated. In addition the invention seeks to provide that the liquid distributor can be operated over a load range which is as great as possible. At the same time the invention sought to ensure that the geometry of the liquid distributor does not lead to an excessive pressure drop in the gas phase or irregular gas distribution and distribution of the liquid with the liquid distributor according to the invention aims to be effected in such a way that the delivered liquid is entrained as little as possible by the gas flow which rises in the column.

That object is attained in that the nozzles for producing the liquid jets in the liquid distributor according to the invention are characterised in that these involve flat-jet nozzles which produce a respective flat jet, wherein the flat-jet nozzles are so oriented that the flat jet produced by them impinges on a drain element which is arranged at the liquid distributor and at which the liquid of the flat jet can drain away.

Here the term flat-jet nozzle is used to mean a hydraulic nozzle in which the liquid under pressure is pressed through a small opening and is accelerated outwardly at high speed in such a way that in that case a spray pattern is produced on a plane on which the geometrical center point of the jet impinges perpendicularly everywhere, wherein the cross-sectional area of the spray pattern is markedly longer in one dimension (wide side) than in the other dimension (narrow side). In that respect the geometrical shape that the cross-sectional area precisely represents is immaterial, whether it is for example elliptical or angular. The only crucial consideration is that the ratio of wide side to narrow side is at least 3:1. Preferably the ratio of wide side to narrow side is at least 4:1, at least 5:1, at least 10:1, or even at least 20:1. The type of flat-jet nozzle can basically also be freely selected as long as a flat jet having the above-mentioned properties is produced thereby. Examples of flat-jet nozzle types which can be used according to the invention are slot nozzles, rebound nozzles or inclined jet nozzles.

One of the advantages of a flat jet is that that makes it possible to construct liquid distributors which occupy relatively little cross-sectional area and thus ensure a large free cross-section in the column, which in turn signifies a low pressure drop on the gas side. That applies in particular to the embodiments in which the liquid is delivered along at least one line on to the packing bodies therebeneath (line distributors), wherein the flat-jet nozzles are disposed in a row on the at least one line of the line distributor and wherein gas which rises in the column can flow unretardedly between a plurality of mutually juxtaposed lines of a line distributor. Correspondingly, in a preferred embodiment, the flat-jet nozzles are disposed in at least one row, wherein the flat-jet nozzles in the at least one row are so oriented that the longitudinal sides of the liquid jets produced thereby extend on a line.

In addition the flat jet affords less attack target area for gases rising in the column than the jet of a full-cone nozzle so that the danger of drop entrainment is reduced with the flat jet. According to the invention drop entrainment is additionally minimized by the flat-jet nozzles being so oriented that the flat jet produced by them impinges on a drain element which is arranged on the liquid distributor and on which the liquid of the flat jet can drain away. As soon as the flat jet issuing under pressure from the nozzle, by virtue of its decreasing kinetic energy, runs the risk of being entrained upwardly by the rising gas flow, the jet according to the invention impinges on the drain element which is arranged on the liquid distributor and on which the liquid can then drain away in a condition of being protected from the rising gas flow. Desirably the drain element is of such a configuration and is so arranged on the liquid distributor that the flat jet impinging thereon is received over its full surface area. Therefore according to the invention the drain element is an integral component part of the liquid distributor and is so arranged as to ensure that the liquid jet in regular operation always impinges at a predetermined angle on the drain element over its full surface area.

The liquid distributor according to the invention is arranged in the column interior of the process-technology column over the other column internal fitments and/or the filling bodies and/or packings arranged therein. The flat-jet nozzles of the liquid distributor according to the invention are accordingly usually so arranged that they each produce a respective downwardly directed liquid jet.

The liquid distributor according to the invention has at least 2 flat-jet nozzles. In certain embodiments of the invention the liquid distributor has at least 3 flat-jet nozzles, at least 5 flat-jet nozzles or at least 10 flat-jet nozzles.

Preferably the liquid distributor according to the invention provides at least 1 flat-jet nozzle per m² of column cross-section. The number of flat-jet nozzles however can also be markedly greater. For most columns used, the number of flat-jet nozzles is desirably in the range of between 1 and 20/m², preferably in the range of between 1 and 5/m².

To achieve a liquid distribution which is as wide as possible the spray angle (β) which is achieved at the wide side of the flat-jet nozzles according to the invention should be as large as possible. Preferably the spray angle (β) is at least 30°, still more preferably at least 45° and up to 120° or even up to 150°.

The feed of liquid to the nozzles is implemented by way of a liquid feed suitable for conducting the respectively used liquid to the nozzles. In that case the capacity of the liquid feed is matched to the desired volume flow. For example the volume flow V (l/min) at a pressure p of 1 bar in certain embodiments is in the range of between 2 and 20 l/min/nozzle.

Adjustment of the liquid feed (quantity) for the individual nozzles is preferably effected by orifice members provided in the liquid feed at the transition to the respective flat-jet nozzle, or other adjusting devices for quantitative regulation.

If the flat-jet nozzles of the present invention are arranged on a line the parameters of quantity of liquid, pressure, spray pattern, spacing of the nozzle relative to the drain surface and pressure are in that case easily adjusted by the man skilled in the art in such a way that the drain element is wetted with liquid over the entire length of the line.

The drain element provided according to the invention must be suitable for receiving the quantity of liquid impinging thereon so that the received liquid can either drain away film-like on the surface of the drain element or is received in a pore-like structure of the drain element in order then to flow downwardly through same. In an embodiment of the present invention the drain element is accordingly provided in the form of a closed drain surface on which the liquid can drain away film-like without penetrating into the material. In an alternative embodiment the drain element comprises a porous material into which the liquid can penetrate and through which it can flow. In a further alternative embodiment the drain element is a packing element, into the network of which the liquid can penetrate in order to further leave the network downwardly again.

The porous materials used in connection with the present invention are materials whose porosity has a proportion of open porosity so that the material can at least partly absorb the liquid of the liquid jet. Preferably the porous materials used in the present invention are materials whose total porosity has a proportion of at least 10% of open porosity. Still more preferably the material has a proportion of open porosity of at least 20%, at least 30%, at least 40% or at least 50%.

Preferably the porous materials used in the present invention are materials with a mean pore size in the range of between 0.01 and 10 mm. In preferred embodiments of the invention the mean pore size is at least 0.10 mm, at least 0.25 mm or at least 0.50 mm. The upper limit of the mean pore size is preferably 2.5 mm, 5.0 mm or 7.5 mm or 10 mm.

In the embodiments in which the drain element is provided in the form of a packing that packing is in the form of a structured packing comprising thin, corrugated and apertured metal plates or wire meshes. The hydraulic diameters of the elements used are in the range of between 1 and 50 mm, preferably in the range of between 3 and 20 mm.

In principle the flat jet produced by the flat-jet nozzle impinges with its wide side on the surface of the drain element at an impingement angle (α) in the range of between 0° and 90°. Preferably however the impingement angle (α) is 1° or more, 3° or more, 5° or more, 10° or more or even 15° or more, in preferred embodiments the impingement angle (α) is limited upwardly with up to 75° or less, up to 60° or less, up to 45° or less, up to 30° or less or up to 20° or less.

The vertical difference between the height of the nozzle outlet opening and the height of the geometrical center point of the cross-sectional area of the liquid jet impinging on the drain element is preferably at least 5 cm, depending on the use involved. In certain embodiments the vertical difference is at a maximum 80 cm. In particularly preferred embodiments the difference is 8 cm or more, 10 cm or more or 20 cm or more. In particular embodiments the vertical difference is limited upwardly to 60 cm or less or only 30 cm or less.

In the embodiments in which the drain element is in the form of a drain surface, on which the flat jet produced by the flat-jet nozzle impinges with its wide side, that preferably occurs at an impingement angle (a) in the range of between 1° and 60°. In these embodiments the impingement angle is preferably 3° or more, 5° or more, 10° or more or 15° or more and at a maximum up to 45° or less, up to 30° or less or only up to 20° or less.

After impingement of the flat jet on the drain surface the situation usually involves further fanning-out of the liquid film occurring in that case. That film however can sometimes exhibit a certain degree of nonhomogeneity at least in portions and in certain embodiments in which the drain element is a drain surface a longitudinal exchange element for longitudinal exchange of the liquid film draining away on the drain surface is therefore provided in the drain surface or at the lower edge of the drain surface in the longitudinal direction of the edge. Typically the longitudinal exchange element extends horizontally and thus mostly parallel to the lower edge of the drain surface. The longitudinal exchange element ensures that the liquid which is draining away is reliably rendered uniform by longitudinal exchange of the liquid film draining away on the drain surface.

In preferred embodiments the longitudinal exchange element is a channel, a porous material or a packing element. In the embodiments in which the longitudinal exchange element is in the form of a channel it preferably has an overflow edge and/or openings, by way of which the liquid can drain away from the channel. In an alternative embodiment in which the longitudinal exchange element is provided in the form of a channel the overflow edge thereof passes into a drip surface, by way of which the liquid can drain away and the liquid can drip off at the lower edge thereof. Particularly for liquids with strong cohesion force like for example water the lower edge of the drip surface is preferably formed in a jagged or wave shape so that the liquid draining away by way of the drip surface can collect at the wave or jagged edge tips and can thus more easily drip off.

To protect the liquid jet issuing from the flat-jet nozzle in relation to gas which rises in the column interior, in preferred embodiments of the invention it is proposed that provided on the liquid distributor is at least one screening element which screens at least a wide side of the flat jet relative to the surroundings. Desirably the screening element is at least as wide as the wide side of the flat jet and at least as long as the flat jet length. In the embodiments in which the drain element is in the form of a drain surface the screening element is preferably at least as wide and at least as long as the liquid film which results from the flat jet impinging on the drain element. In various embodiments the screening element is in the form of a closed screening surface, in the form of a porous screening material or in the form of a screening packing element, wherein the terms closed surface, porous material and packing are here defined as above.

In the embodiments of the invention in which at least one screening element is provided on the liquid distributor it is advantageously connected at the two ends to the drain element so that this provides a housing which is open downwardly but in other respect closed on all sides for the region in which the flat jet is produced, and in accordance with a respective embodiment preferably also for the region in which a liquid film is produced on a drain surface from the flat jet.

In a special embodiment of the present invention the flat jet produced by the flat-jet nozzle impinges on the one side with its wide side at an impingement angle ($\alpha$) of between 1° and 60° on a guide plate provided as the drain element, wherein the opposite side of the flat jet is screened with respect to the column interior by way of a screening plate, a screening layer of porous material or a packing layer. In that way the wide sides of the liquid jet are completely screened with respect to the column interior and in a quite particularly preferred embodiment that screening also includes on both sides the region over which the liquid film runs away on the guide plate.

The liquid distributor according to the invention is used for the delivery of a liquid on to a process-technology column. The present application therefore also claims a process-technology column which includes a liquid distributor of the kind according to the invention.

The present application claims in particular a method of purifying or separating a liquid mixture by means of packings or filling bodes disposed in a process-technology column, wherein the liquid mixture to be purified or separated is passed on to the packings or filling bodies by way of a liquid distributor of the kind according to the invention.

The columns used in connection with the present invention are preferably columns for the thermal separation of liquid mixtures. Particularly preferred process-technology columns according to the present invention are absorption, distillation or rectification columns.

For the purposes of the original disclosure it is pointed out that all features as can be seen by a man skilled in the art from the present description, the accompanying drawings and the claims, even if they are described specifically only in connection with certain other features, can be combined both individually and also in any combinations with others of the features or groups of features disclosed here insofar as that has not been expressly excluded or technical aspects makes such combinations impossible or meaningless. A comprehensive explicit representation of all conceivable combinations of features is dispensed with here only for the sake of brevity and readability of the description.

In addition it is pointed out that it is self-evident to the man skilled in the art that the accompanying Figures and the specific description hereinafter only serve to set out by way of example the possible configurations of the present invention, that are set forth as embodiments by way of example. The man skilled in the art will therefore readily understand that in addition all other structures which have the features or combinations of features according to the invention as recited in the claims also lie within the scope of protection of the invention. A comprehensive explicit representation of all conceivable embodiments is dispensed with here only for the sake of brevity and readability of the description.

SPECIFIC DESCRIPTION

Figure 2:
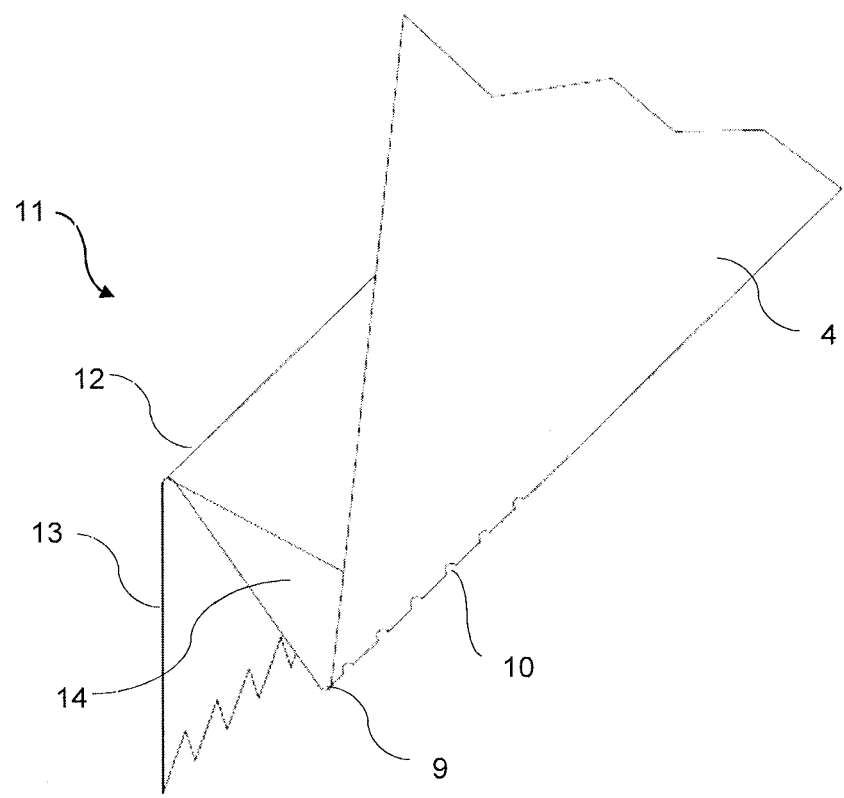
Figure 3:
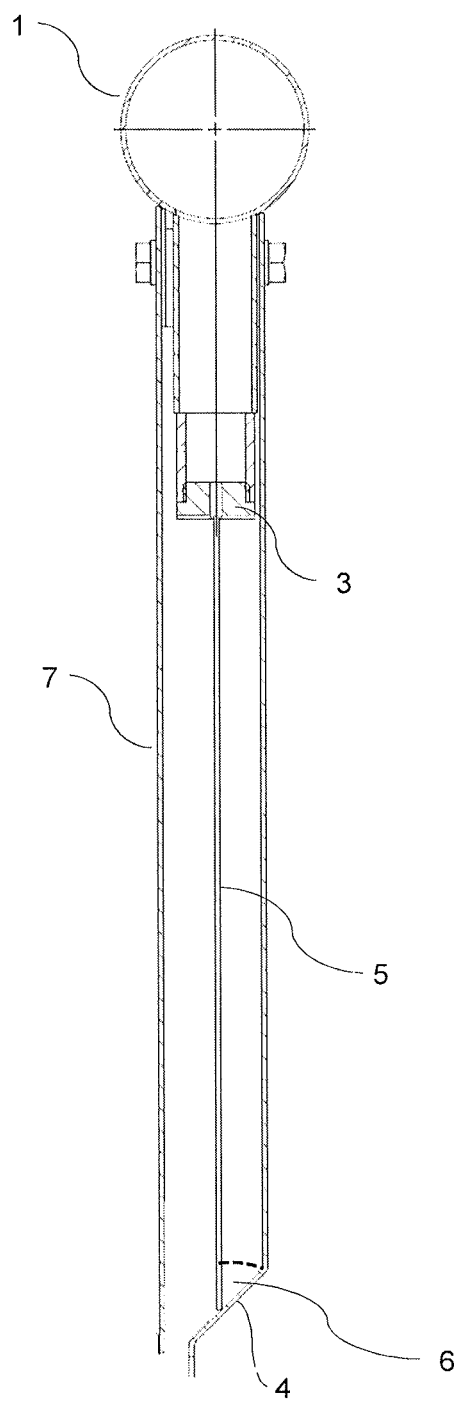
Figure 4:
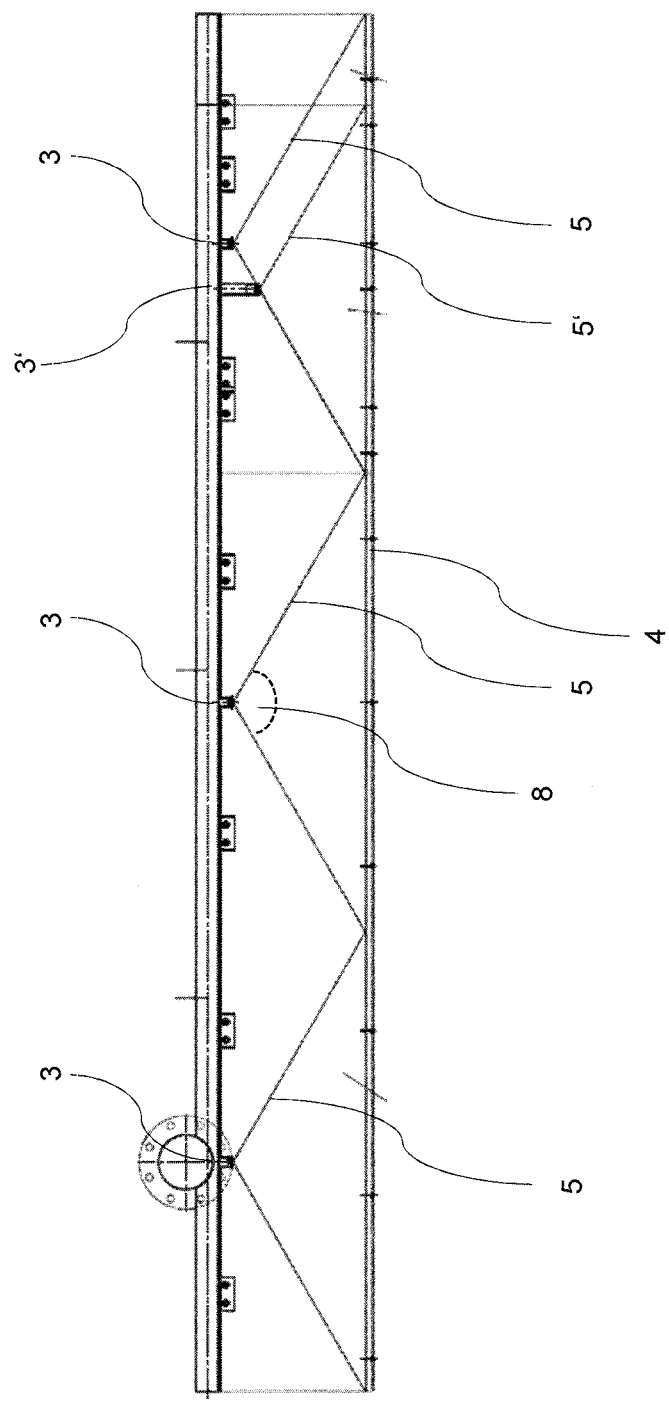

In accompanying FIGS. 1 through 4:

FIG. 1 shows a cross-sectional view of an embodiment of the liquid distributor according to the invention in which the liquid jet is directed on to a drain plate, FIG. 2 shows a detail of the liquid delivery of a specific embodiment of the present invention, FIG. 3 shows an embodiment of the liquid distributor according to the invention involving an alternative geometry, and FIG. 4 shows a row arrangement of flat-jet nozzles in a certain embodiment of the invention in the form of a line distributor.

In the embodiment shown in FIG. 1 the liquid to be passed on to the separation column is passed by way of a tubular liquid feed 1 to the flat-jet nozzles 3. Disposed at the transition of the tube of the liquid feed 1 to the flat-jet nozzle is a quantitative regulation element 2. That quantitative regulation element 2 in this embodiment is in the form of an orifice member for regulating the quantity of liquid passing therethrough. After the liquid passes through the quantitative regulating element 2 the liquid passes into the flat-jet nozzle 3. That flat-jet nozzle 3 produces the flat jet 5 which impinges at the impingement angle (a) 6 on a drain element 4 arranged on the liquid distributor. In this embodiment the drain element 4 is in the form of a guide plate which is arranged on the liquid distributor and which extends from just above the flat-jet nozzle 3 downwardly, the guide plate being set slightly at an angle in the direction of the flat jet. That gives an impingement angle (a) 6 between the wide side of the vertically downwardly directed flat jet 3 and the inwardly directed surface of the guide plate provided as the drain element 4.

The drain element 4 provided in the form of the guide plate screens the one side of the flat jet relative to the column interior while on the opposite side the flat jet 5 in the embodiment discussed here is screened relative to the column interior by the screening plate provided in the form of the additional screening surface 7. In the embodiment illustrated here the surface of the screening plate 7 extends over the entire length of the flat jet including the length over which the flat jet runs down on the drain element 4.

A liquid delivery means 11 of a specific configuration at the lower end adjoins the guide plate of the drain element 4 in the embodiment illustrated here, and a detail of that liquid delivery means 11 of the embodiment illustrated here is shown in following FIG. 2.

FIG. 2 shows a liquid delivery means 11 as can be implemented in many embodiments of the present invention, for example the embodiment shown in FIG. 1. At the lower end of the guide plate of the drain element 4, the guide plate in this embodiment is curved a distance further upwardly in order thus to form a channel 9 serving as a longitudinal exchange element for homogenizing a flat jet which is possibly not completely homogeneous. More specifically, the liquid draining down on the guide plate of the drain element 4 can collect in the channel and in that situation can be distributed uniformly in the longitudinal direction. When the level of the liquid 14 collected in the channel 9 has reached the height of the overflow edge 12 of the liquid can drain away over the adjoining drip surface 13 and drip off at the lower edge of that drip surface 13. In the embodiment illustrated here, the lower edge of the drip surface 13 is of a jagged configuration to make it easier for liquids of particularly high cohesion force like for example water to more readily drip off.

Optionally in the embodiment illustrated here apertures 10 can be provided at the lowest point of the channel 9, through which apertures liquid can also drip out of the liquid distributor according to the invention. Those apertures 10 do not necessarily have to be at the lowest point of the channel 9 but that is desirable to ensure that the liquid completely runs away when the liquid delivery is to be concluded.

FIG. 3 shows a further embodiment of the present invention. Here too provision of the liquid to be delivered is implemented by way of the liquid feed 1 which passes the liquid to the flat-jet nozzle 3. In contrast to the embodiment shown in FIG. 1, this embodiment provides that the guide plate acting as the drain element 4 extends vertically and parallel to the flat jet 5. It is only right at the end of the guide plate that the guide plate bends in the direction of the flat jet 5 and forms with the vertically downwardly directed flat jet 5 the impingement angle (a) 6. Adjoining the region in which the flat jet 5 impinges on the guide plate the guide plate once again bends away vertically downwardly and at the lowermost end forms a drip edge from which the liquid draining down on the guide plate can drip off.

FIG. 4 shows a row arrangement of flat-jet nozzles 3 in a certain embodiment of the present invention. More specifically three flat-jet nozzles 3 are shown, which are so arranged in the liquid distributor according to the invention that the flat jets 5 thereof lie in the longitudinal direction on a line, wherein the spray angle ($\beta$) 8 is so selected that the flat jets 5 of two adjacent flat-jet nozzles 3 are in contact at the location at which they impinge on the drain element 4. That provides a continuous liquid film which can drip off at the lower end of the drain element 4 over the entire length of the flat-jet nozzle row on a line. Taking the example of the flat-jet nozzle shown as alternative 3', the Figure shows how the width of the flat jet can be varied by selecting flat-jet nozzles of greater or lesser length. The spray angle ($\beta$) 8 is preferably in a range of between 30° and 150°.

LIST OF REFERENCES

1 liquid feed
2 quantitative regulation
3, 3' flat-jet nozzles
4 drain element
5, 5' flat jet
6 impingement angle ($\alpha$)
7 screening surface
8 spray angle ($\beta$)
9 channel
10 apertures
11 liquid delivery
12 overflow edge
13 drip surface
14 liquid

The invention claimed is:

1. A liquid distributor of a process-technology column, comprising:
   a liquid feed for conducting a liquid;
   at least 2 flat-jet nozzles connected to the liquid feed for producing respective liquid flat jets each having a wide side and a narrow side; and
   a drain element for allowing liquid of the flat jets to drain away, the drain element being an integral component part of the liquid distributor,
   wherein the flat-jet nozzles are so oriented that the wide side of each of the flat jets impinge on a surface of said drain element at an impingement angle ($\alpha$) in the range of between 1° and 75°.

2. The liquid distributor according to claim 1, wherein the drain element is a drain surface, a porous material or a packing element.

3. The liquid distributor according to claim 1, wherein the spray angle ($\beta$) of the flat-jet nozzles is in a range of between 30° and 150°.

4. The liquid distributor according to claim 1, wherein the drain element is a drain surface which has a horizontally extending longitudinal exchange element for longitudinal exchange of the liquid draining away at the drain surface.

5. The liquid distributor according to claim 4, wherein the longitudinal exchange element is a channel, a porous material or a packing element.

6. The liquid distributor according to claim 1, wherein the volume flow V per minute at a pressure p of 1 bar is between 0.2 and 20 l/min/nozzle.

7. The liquid distributor according to claim 1, wherein the number of flat-jet nozzles is in the range of between 1 and 20 flat-jet nozzles per $m^2$ of column cross-section.

8. The liquid distributor according to claim 1, further comprising at least one screening element which screens at least the wide sides of the flat jets with respect to the surroundings.

9. The liquid distributor according to claim 8, wherein the screening element is a screening surface, a porous screening material or a screening packing element.

10. The liquid distributor according to claim 1, wherein the wide sides of the flat jets each has two sides with one side impinging at an impingement angle ($\alpha$) in the range of between 1° and 60° on a guide plate provided as the drain element and an opposite side being screened by a screening plate with respect to the column interior.

11. The liquid distributor according to claim 1, wherein the flat jet nozzles are arranged in at least one row, wherein the flat-jet nozzles in the at least one row are so oriented that longitudinal sides of the flat jets extend on a line.

12. The liquid distributor according to claim 1, wherein the flat jet nozzles each has a nozzle outlet opening and wherein the vertical difference between the height of the nozzle outlet opening and the height of the geometrical center point of the cross-sectional area of the flat jet impinging on the drain element is in the range of between 5 and 80 cm.

13. A process-technology column including the liquid distributor according to claim 1.

14. The process-technology column according to claim 13, wherein the process-technology column is a column for thermal separation of liquid mixtures.

15. The process-technology column according to claim 13, wherein the process-technology column is a column for thermal separation of liquid mixtures.

16. A method of purifying or separating a liquid mixture by means of packings or filling bodies disposed in a process-technology column, wherein the liquid mixture to be purified or separated is passed on to the packings or filling bodies by way of the liquid distributor according to claim 1.

17. The method according to claim 16, wherein the process-technology column is a column for thermal separation of liquid mixtures.

\* \* \* \* \*